United States Patent
Wu

(10) Patent No.: US 10,209,587 B2
(45) Date of Patent: Feb. 19, 2019

(54) ARRAY SUBSTRATE, LIQUID CRYSTAL DISPLAY PANEL AND DISPLAY DEVICE

(71) Applicant: Xiamen Tianma Micro-Electronics Co., Ltd., Xiamen (CN)

(72) Inventor: Hao Wu, Xiamen (CN)

(73) Assignee: XIAMEN TIANMA MICRO-ELECTRONICS CO., LTD. (CN)

( * ) Notice: Subject to any disclaimer, the term of this patent is extended or adjusted under 35 U.S.C. 154(b) by 0 days.

(21) Appl. No.: 15/702,819

(22) Filed: Sep. 13, 2017

(65) Prior Publication Data

US 2018/0348584 A1    Dec. 6, 2018

(30) Foreign Application Priority Data

Jun. 6, 2017   (CN) .......................... 2017 1 0418357

(51) Int. Cl.

| G02F 1/136 | (2006.01) |
|---|---|
| G02F 1/1362 | (2006.01) |
| G02F 1/1333 | (2006.01) |
| G02F 1/137 | (2006.01) |
| G06F 3/041 | (2006.01) |
| G06F 3/044 | (2006.01) |

(Continued)

(52) U.S. Cl.
CPC ........ *G02F 1/136227* (2013.01); *G02F 1/137* (2013.01); *G02F 1/1368* (2013.01); *G02F 1/13338* (2013.01); *G02F 1/133345* (2013.01); *G02F 1/136286* (2013.01); *G06F 3/044* (2013.01); *G06F 3/0412* (2013.01); *G02F 1/134336* (2013.01); *G02F 2001/13606* (2013.01); *G02F 2001/13685* (2013.01); *G02F 2001/13712* (2013.01); *G02F 2201/121* (2013.01); *G02F 2201/122* (2013.01); *G02F 2201/123* (2013.01)

(58) Field of Classification Search
None
See application file for complete search history.

(56) References Cited

U.S. PATENT DOCUMENTS

| 9,651,815 B2 * | 5/2017 | Yu ........................... G06F 3/044 |
| 2012/0069257 A1 * | 3/2012 | Oh ...................... G02F 1/13338 349/42 |

FOREIGN PATENT DOCUMENTS

| CN | 104571700 A | 4/2015 |
| CN | 104698709 A | 6/2015 |

* cited by examiner

*Primary Examiner* — Richard H Kim
(74) *Attorney, Agent, or Firm* — Tarolli, Sundheim, Covell & Tummino LLP

(57) ABSTRACT

The present disclosure provides an array substrate, including: a base substrate, a plurality of scan lines; a plurality of data lines arranged by intersecting with the plurality of scan lines; a plurality of thin film transistors arranged in a matrix, each thin film transistor includes a gate electrode, an active layer and a drain electrode; a planarization layer covering the gate electrode, the active layer and the drain electrode, a position of the planarization layer corresponding to the drain electrode is provided with a through hole penetrating through the planarization layer, and the drain electrode is located in the through hole; a filling electrode, located in the through hole and connected with the drain electrode and covers the drain electrode; and a pixel electrode, indirectly connected with the drain electrode through the filling electrode.

11 Claims, 10 Drawing Sheets

(51) Int. Cl.
*G02F 1/1368* (2006.01)
*G02F 1/1343* (2006.01)

ARRAY SUBSTRATE, LIQUID CRYSTAL DISPLAY PANEL AND DISPLAY DEVICE

CROSS-REFERENCE TO RELATED APPLICATIONS

The present application claims the benefit of priority to Chinese Patent Application No. 201710418357.5, filed on Jun. 6, 2017, the content of which is incorporated herein by reference in its entirety.

TECHNICAL FIELD

The present disclosure relates to the field of display technologies and, in particular, to an array substrate, a liquid crystal display panel and a display device.

BACKGROUND

With rapid development of display techniques, the touch display device has been widely applied in peoples' life. At the original stage of development of touch display, a touch display panel is formed by fitting a touch panel and a display panel together, so as to achieve touch display. The touch panel and the display panel need to be prepared separately, the cost is high, the thickness is large, and the production efficiency is poor. With development of the touch display techniques, an embed touch display panel is proposed. The embed touch display panel is formed by embedding a touch electrode into a display panel, which can reduce the thickness of the entire module and can significantly reduce manufacture cost of the touch display device, thereby obtaining attentions of many panel manufactures.

At present, in a touch display panel, a touch signal line and a touch electrode are generally arranged on an array substrate. The array substrate includes: a plurality of parallel scan lines and a plurality of parallel data lines, the scan lines and the data lines are mutually insulated and arranged by intersecting, so as to define a plurality of pixels. Each pixel is provided with a thin film transistor and a pixel electrode, the pixel electrode is connected with a corresponding data line through the thin film transistor in the pixel. Further, in order to achieve touch function, the array substrate further includes a common electrode layer which is not in the layer where the pixel electrode is located, and a plurality of touch signal lines. The common electrode layer is divided into a plurality of common electrode blocks. The common electrode blocks are also used as touch electrodes, the touch signal lines are connected with corresponding touch electrodes.

In the touch display panel, the coupling capacitance between the data line and the pixel electrode is large, especially in a negative liquid crystal display panel, the drive voltage on the date line is high, the voltage has big fluctuation, which results in big influence to the pixel electrode, thus the crosstalk phenomenon of the display device is serious. Generally, since the intervening layer (e.g., passivation layer and/or planarization layer) between the pixel electrode and the drain electrode is thick, so that the depth of the through hole connecting the pixel electrode and the drain electrode is great. Therefore, if directly reducing the width of the drain electrode to increase the distance between the data line and the pixel electrode, when the pixel electrode is connected with the drain electrode through the through hole, problems of wire breakage and fall-off of the pixel electrode may occur, resulting in poor display effect such as dark spots, thereby causing a decreasing yield of the display device.

SUMMARY

An object of the present disclosure is to provide an array substrate, a liquid crystal display panel, a display device, so as to solve the problem of heavy crosstalk phenomenon of the display device due to the influence of the data line to the pixel electrode in the prior art.

The present disclosure provides an array substrate, including: a base substrate; a plurality of scan lines; a plurality of data lines intersecting with the plurality of scan lines; a plurality of thin film transistors arranged in a matrix, each thin film transistor including a gate electrode, an active layer and a drain electrode; a planarization layer covering the gate electrode, the active layer and the drain electrode, a filling electrode; and a pixel electrode; wherein a through hole is defined in a part of the planarization layer corresponding to the drain electrode, and a width of the drain electrode is smaller than a width of a bottom of the through hole; wherein the filling electrode is located in the through hole, and the filling electrode is connected with the drain electrode and covers the drain electrode; and wherein the pixel electrode extends through the through hole to connect with the filling electrode.

The present disclosure further provides a liquid crystal display panel, including: an array substrate, a color film substrate arranged opposite to the array substrate, and a liquid crystal layer arranged between the array substrate and the color film substrate; wherein the array substrate includes: a base substrate; a plurality of scan lines; a plurality of data lines intersecting with the plurality of scan lines; a plurality of thin film transistors arranged in a matrix, each thin film transistor including a gate electrode, an active layer and a drain electrode; a planarization layer covering the gate electrode, the active layer and the drain electrode, a filling electrode; and a pixel electrode; wherein a through hole is defined in a part of the planarization layer corresponding to the drain electrode, and a width of the drain electrode is smaller than a width of a bottom of the through hole; wherein the filling electrode is located in the through hole, and the filling electrode is connected with the drain electrode and covers the drain electrode; and wherein the pixel electrode extends through the through hole to connect with the filling electrode.

In addition, the present disclosure further provides a display device, including a liquid crystal display panel, wherein the liquid crystal display panel includes an array substrate, a color film substrate arranged opposite to the array substrate, and a liquid crystal layer arranged between the array substrate and the color film substrate; wherein the array substrate includes: a base substrate; a plurality of scan lines; a plurality of data lines intersecting with the plurality of scan lines; a plurality of thin film transistors arranged in a matrix, each thin film transistor including a gate electrode, an active layer and a drain electrode; a planarization layer covering the gate electrode, the active layer and the drain electrode, a filling electrode; and a pixel electrode; wherein a through hole is defined in a part of the planarization layer corresponding to the drain electrode, and a width of the drain electrode is smaller than a width of a bottom of the through hole; wherein the filling electrode is located in the through hole, and the filling electrode is connected with the drain electrode and covers the drain electrode; and wherein the pixel electrode extends through the through hole to connect with the filling electrode.

Comparing with the prior art, technical solutions provided by the present disclosure have the following advantages: the present disclosure provides an array substrate, including: a base substrate, a plurality of scan lines, and a plurality of data lines intersecting with the plurality of scan lines, a plurality of thin film transistor arranged in a matrix, each thin film transistor includes a gate electrode, an active layer and a drain electrode, a planarization layer covering the gate electrode, the active layer and the drain electrode, a position of the planarization layer corresponding to the drain electrode is provided with a through hole penetrating through the planarization layer, a width of the drain electrode is smaller than a width of a bottom of the through hole, a filling electrode, located in the through hole and connected with the drain electrode and covers the drain electrode, a pixel electrode, connected with the filling electrode through the through hole and indirectly connected with the drain electrode through the filling electrode. That is to say, through reducing the width of the drain electrode and increasing the distance between the data line and the pixel electrode, the coupling capacitance between the data line and the pixel electrode is reduced and the influence of the data line to the pixel electrode is reduced, thereby improving the crosstalk phenomenon of the display device; moreover, a filling electrode is provided on the drain electrode, and the filling electrode has a certain thickness, thus the segment difference between the drain electrode and the side wall of the through hole can be compensated, thereby solving the problem of wire breakage of the pixel electrode, and increasing yield of the display device.

BRIEF DESCRIPTION OF DRAWINGS

Other features, objects and advantages of the present disclosure will be more apparent with reference to the detailed description of non-restrictive embodiments shown in the following figures.

DESCRIPTION OF EMBODIMENTS

The present disclosure will be described in further detail with reference to the drawings and embodiments. It should be understood that the embodiments described herein are only used to illustrate the present disclosure, rather than limit the present disclosure it should be noted that, for easy of description, the accompanying drawings only show parts of the structures relevant to the present disclosure, rather than all of them.

Figure 1:
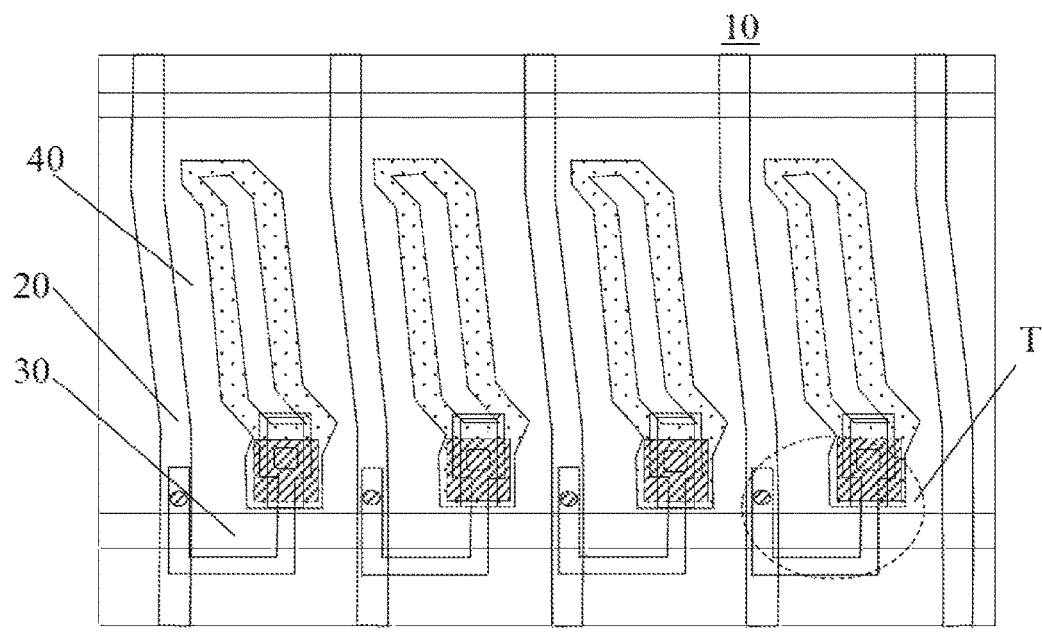
FIG. 1 illustrates a schematic diagram of an array substrate according to an embodiment of the present disclosure.
Figure 2:
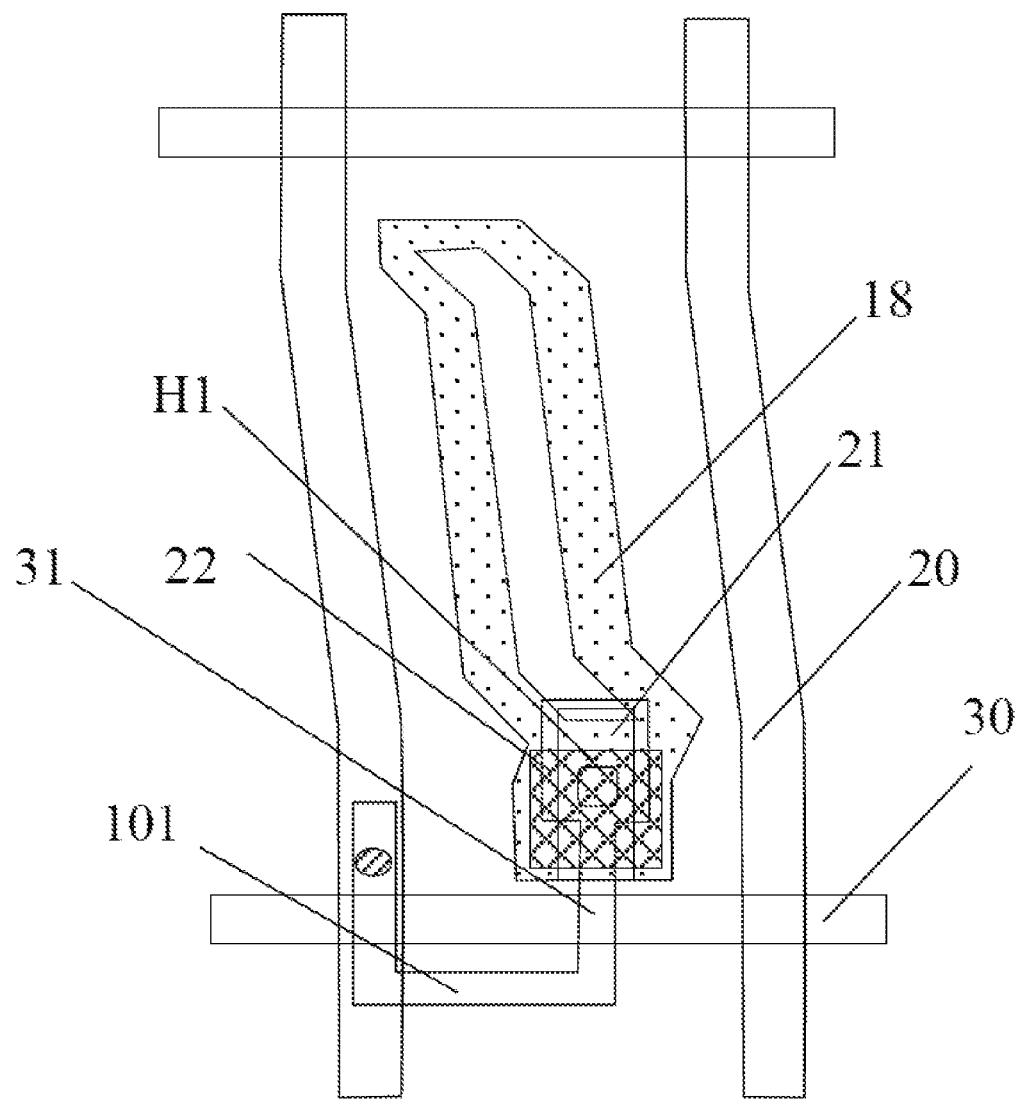
FIG. 2 illustrates a schematic diagram of a pixel unit on the array substrate shown in FIG. 1.

An embodiment of the present disclosure provides an array substrate, as shown in FIG. 1 and FIG. 2. FIG. 1 illustrates a schematic diagram of an array substrate according to an embodiment of the present disclosure, FIG. 2 illustrates a schematic diagram of a pixel unit on the array substrate shown in FIG. 1. The array substrate 10 includes a plurality of data lines 20 and a plurality of scan lines 30. The plurality of data lines 20 and the plurality of scan lines 30 are arranged by intersecting, so as to define a plurality of pixel units 40. The plurality of pixel units 40 include a plurality of columns of pixel units arranged in a first direction and a plurality of rows of pixel units arranged in a second direction. Moreover, a thin film transistor T is arranged at the intersecting position of the data line 20 and the scan line 30. A plurality of thin film transistors T are arranged in a matrix.

Further, each pixel unit 40 is provided with a pixel electrode 18, and the pixel electrode 18 is connected with a corresponding data line 20 through the thin film transistor T. In an embodiment, the thin film transistor T is a low temperature poly-silicon thin film transistor, including a U-shaped active layer 101, the U-shaped active layer 101 is prepared by ion doping on a low temperature poly-silicon, and the U-shaped active layer 101 includes a source electrode area, a heavy doping area and a drain electrode area, the data line 20 is connected to the source electrode area of the active layer of the corresponding thin film transistor T; a gate electrode 31, arranged corresponding to an area where the scan line 30 is overlapped with the U-shaped active layer 101, that is, an individual gate electrode is not needed in the present embodiment, the area where the scan line 30 is overlapped with the active layer 101 is also used as the gate electrode 31; a drain electrode 21, formed in a same layer where the data line 20 is located, one end of the drain electrode 21 is connected to a drain electrode area of the active layer, the other end of the drain electrode 21 is connected with the pixel electrode 18 through a through hole H1; and a filling electrode 22, located between the pixel electrode 18 and the drain electrode 21, and partially filled in a gap between the drain electrode 21 and a side wall of the through hole H1.

Figure 3:
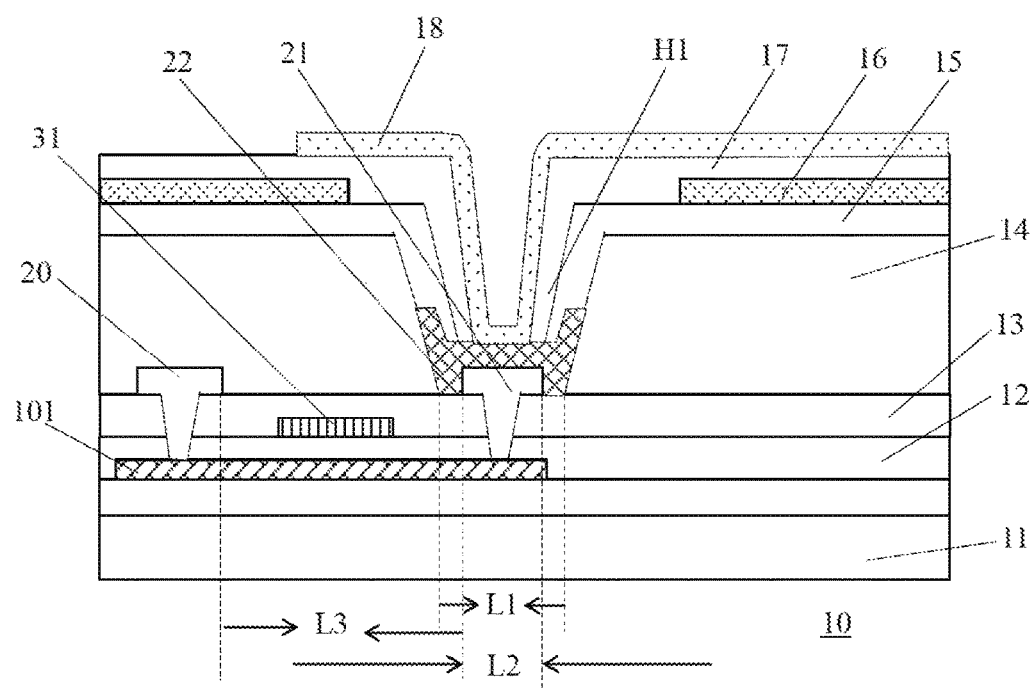
FIG. 3 illustrates a sectional view of the array substrate shown in FIG. 1.

Further, FIG. 3 illustrates a sectional view of the array substrate shown in FIG. 1. As shown in FIGS. 1-3, the array substrate successively includes: a base substrate 11 made of a transparent material such as glass; a buffer layer (not shown in the figures) arranged on the base substrate 11, a substantial U-shaped active layer 101 arranged on the buffer layer; a gate electrode insulating layer 12 covering the active layer 101; a plurality of scan lines 30 parallelly extending on the gate electrode insulating layer 12 and a gate electrode 31. The gate electrode 31 is connected with the scan lines 30, or a part of the scan lines 30 is overlapped with the active layer 101, and the scan line 30 overlapped with the active layer 101 is also used as the gate electrode 31, and an inter-layer insulating film 13 covering the scan lines 30; a plurality of data lines 20, arranged on the inter-layer insulating film 13, an extending direction of the data lines 20 is orthogonal to the extending direction of the scan lines 30; and a plurality of island-shaped drain electrodes 21 arranged on the inter-layer insulating film 13 and between the data lines 20; a planarization layer 14 covering the data lines 20 and the drain electrodes 21, the planarization layer 14 covers the gate electrode 31, the active layer 101 and the drain electrode 21 of the thin film transistor T, and a position of the planarization layer 14 corresponding to the drain electrode 21 is provided with a through hole H1 penetrating through the planarization layer 14.

The drain electrode 21 is totally located in the interior of the through hole H1, a gap is provided between each of two ends of the drain electrode 21 and a side wall of the through hole H1, that is, the width L2 between the two ends of the drain electrode 21 is smaller than the width L1 of the bottom of the through hole H1, which increases the distance L3 between the data line 20 and the drain electrode 21, since the pixel electrode 18 is connected with the drain electrode 21, and the drain electrode 21 and the data line 20 are formed in a same layer, which further increases the distance between the data line and the pixel electrode, and reduces the coupling capacitance between the data line and the pixel electrode, thereby improving the crosstalk phenomenon of the display device.

Further, the array substrate 10 further includes a filling electrode 22, located in the through hole H1, and is in direct contact with the drain electrode 21 and covers the drain electrode 21, and a part of the filling electrode 22 is filled in the gap between each of the two ends of the drain electrode 21 and the side wall of the through hole H1. The pixel electrode 18 is in direct contact with the filling electrode 22, and is indirectly connected with the drain electrode 21 through the filling electrode 22. The filling electrode 22 has a certain thickness, which can compensate the segment difference between the drain electrode and the side wall of the through hole, which solves the problem of wire breakage of the pixel electrode, and increases the yield of the display device. In the present embodiment, the filling electrode can be made of a conductive metal material, or can be made of a transparent conductive oxide material, which will not be limited in the present disclosure.

In the present embodiment, the array substrate 10 further includes a common electrode 16 arranged on the planarization layer 14, a first insulating layer 15 is arranged between the common electrode 16 and the planarization layer 14; and a plurality of pixel electrodes 18 arranged in a matrix and located at a side of the common electrode 16 away from the base substrate 11. A second insulating layer 17 is arranged between the common electrode 16 and the pixel electrode 18, so that the common electrode 16 is spaced and insulated from the pixel electrode 18. In the present embodiment, the through hole H1 successively penetrates through the second insulating layer, the common electrode, the first insulating layer and the planarization layer. The filling electrode is exposed, the pixel electrode is in direct contact with the filling electrode, and is indirectly connected with the drain electrode through the filling electrode.

Further, in a liquid crystal display panel formed by the array substrate, the array substrate can be further provided with an orientation layer (not shown in the figures) covering each pixel electrode, configured to provide an original direction of the liquid crystal layer in the liquid crystal display panel in which the array substrate is located.

Figure 4:
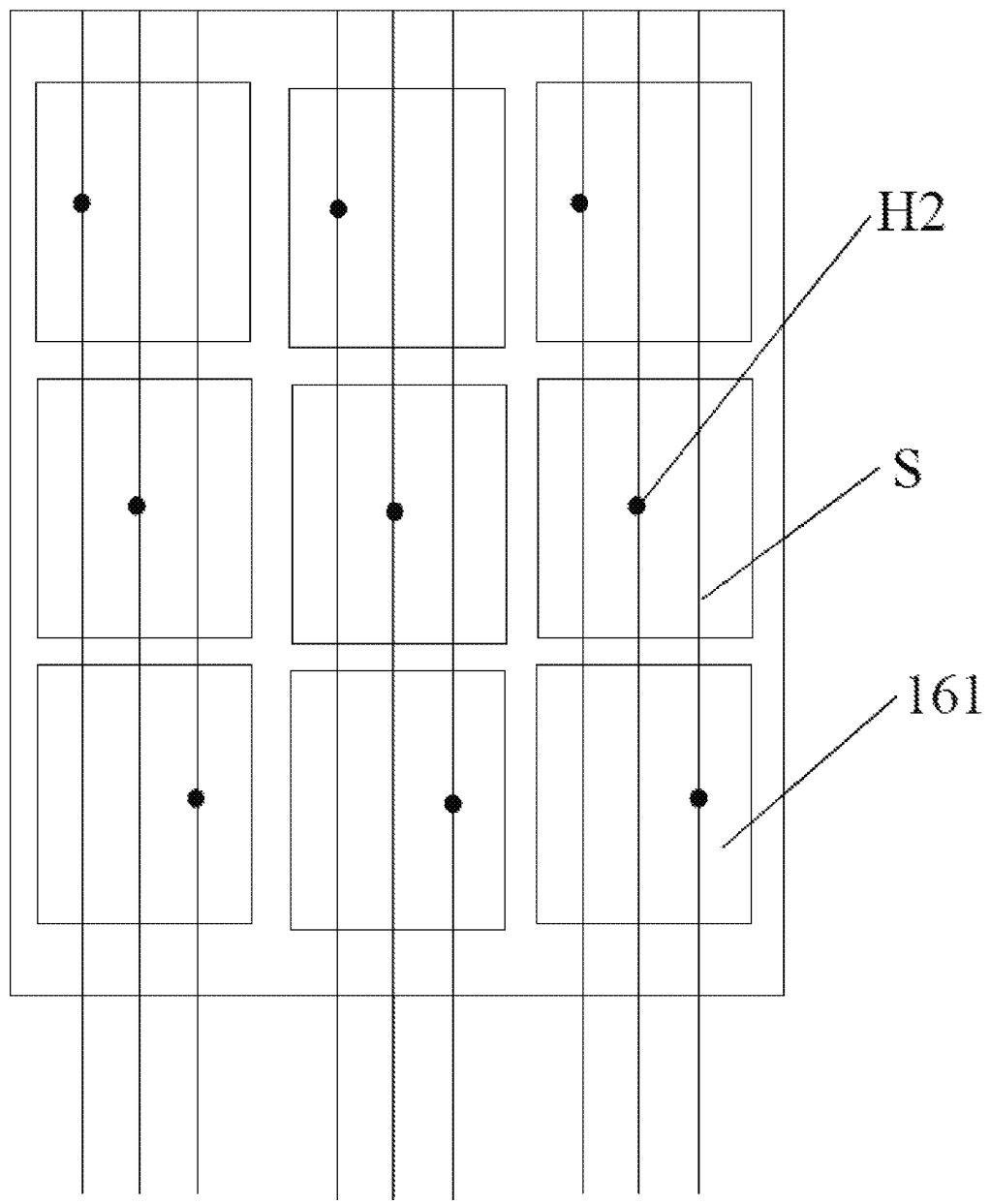
FIG. 4 illustrates a top view of another array substrate according to an embodiment of the present disclosure.
Figure 5:
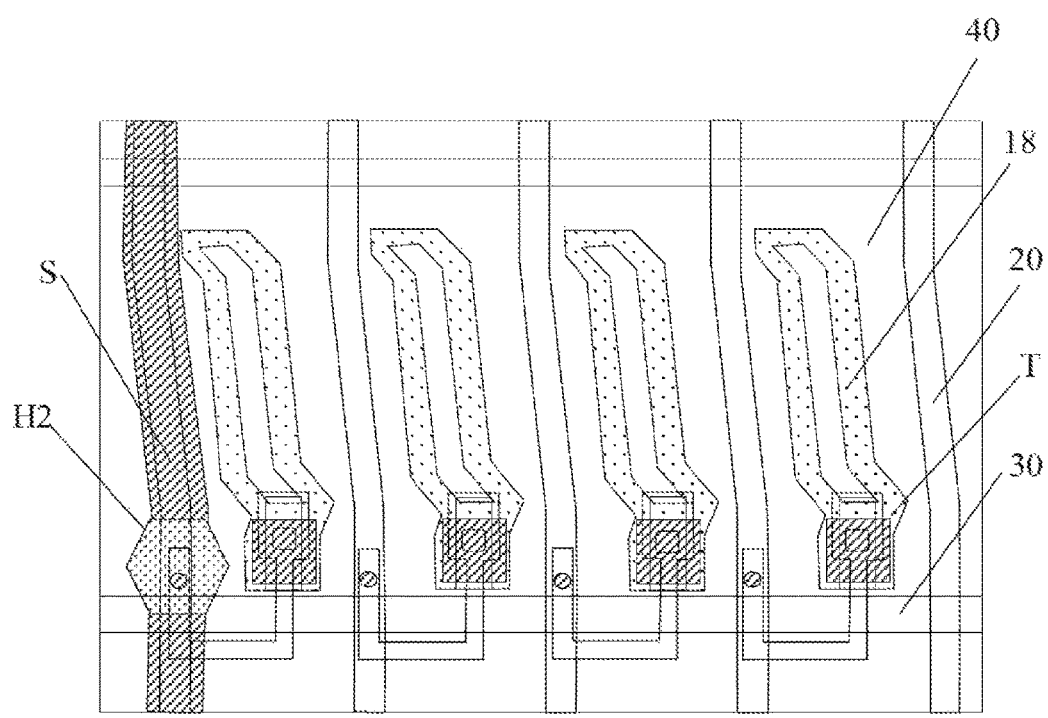
FIG. 5 illustrates a schematic structural diagram of e array substrate shown in FIG. 4.
Figure 6:
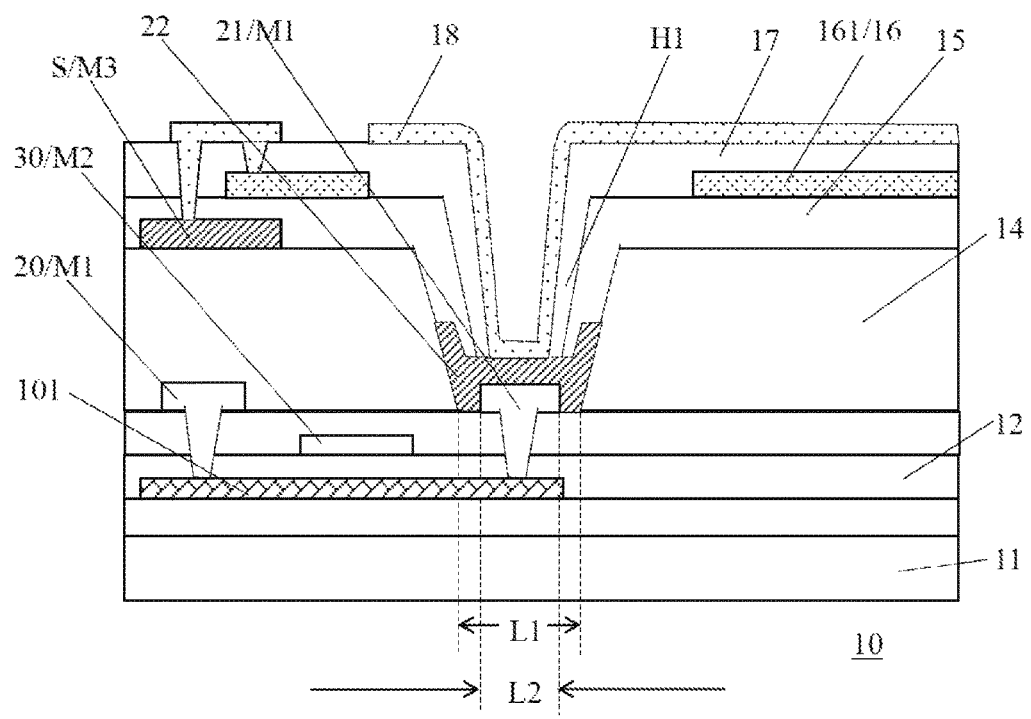
FIG. 6 illustrates a sectional view of the array substrate shown in FIG. 4.

FIG. 4 illustrates a top view of another array substrate according to an embodiment of the present disclosure, FIG. 5 illustrates a structural diagram of the array substrate shown in FIG. 4, FIG. 6 illustrates a sectional view of the array substrate shown in FIG. 4. As shown in FIGS. 4-6, the array substrate is provided with a touch sensing structure, the touch sensing structure includes a plurality of touch electrodes 161 insulated from each other, each touch electrode 161 is also used as the common electrode by time, each touch electrode 161 is at least connected with a drive unit located at an end of the array substrate. During a touch detecting period, the drive unit controls the display device in which the array substrate is located to achieve touch sensing. During a display period, the drive unit controls the display device in which the array substrate is located to display images.

Specifically, the array substrate further includes a plurality of touch signal lines S, the plurality of touch signal lines S is arranged corresponding to the plurality of touch electrodes 161, and is connected with the plurality of touch electrodes 161 through connecting holes H2. During the touch detecting period, each touch electrode 161 is connected with the drive unit through the touch signal line S, a touch integrated circuit in the drive unit generates a touch driving signal, and provides the touch driving signal to the touch electrode 161 through the touch signal lines S, so that the touch electrode 161 carries a certain quantity of electric charge. The touch integrated circuit in the drive unit reads the change of the quantity of electric charge carried by the touch electrode 161 through the touch signal lines S, and thus can judge which touch electrode(s) 161 is being touched through the change of the quantity of electric charge, so as to further determine the position of the touch point. The change of the touch driving signal and of the quantity of electric charge can both be interpreted as a pulse signal.

Further, the array substrate further includes a plurality of parallel data lines 20 and a plurality of parallel scan lines 30, the plurality of data lines 20 and the plurality of scan lines 30 are arranged by intersecting, so as to define a plurality of pixel units 40. The pixel electrode 18 in each pixel unit 40 is connected with the corresponding data line 20 through a switch element T. The extending direction of the touch signal line S is substantially the same with the extending direction of the data line 20, and the touch signal line S is overlapped with the data line 20. In an embodiment, the number of columns of the pixel units between adjacent touch signal lines can be adjusted according to actual demands.

In an embodiment, as shown in FIG. 5 and FIG. 6, the array substrate 10 successively includes a base substrate 11, a switch element T, a planarization layer 14, a first insulating layer 15, a touch electrode 161, a second insulating layer 17 and a pixel electrode 18. The switch element T can be such as a thin film transistor, including a gate electrode, an active layer and a drain electrode. Further, the array substrate 10 further includes a first metal layer M1 forming the scan line 30, a second metal layer M2 forming the data line 20, the first metal layer M1 is arranged between the second metal layer M2 and the base substrate 11. For example, the second metal layer M2 is spaced and insulated from the first metal layer M1 through a gate electrode insulating layer 12, the first metal layer M1 includes a gate electrode and a scan line 30 of the array substrate, configured to provide a scan signal to the pixel unit of the array substrate, the second metal layer M2 includes a drain electrode 21 and a data line 20 of the array substrate, configured to provide a data signal to the pixel electrode of the array substrate. A position of the planarization layer 14 corresponding to drain electrode 21 is provided with a through hole H1 penetrating through the planarization layer 14, and the drain electrode 21 is totally located in the interior of the through hole H1, two ends of the drain electrode 21 are not in contact with a side wall of the through hole H1. A gap is provided between each of the two ends of the drain electrode 21 and the side wall of the through hole H1, that is, the width L2 between the two ends of the drain electrode 21 is smaller than the width L1 of the bottom of the through hole H1, which increases the distance between the data line 20 and the drain electrode 21, since the pixel electrode 18 is connected with the drain electrode 21, and the drain electrode and the data line 20 are formed in a same layer, which further increases the distance between the data line and the pixel electrode, and reduces the coupling capacitance between the data line and the pixel electrode, so that the influence of the data line to the pixel electrode is reduced, thereby improving the crosstalk phenomenon of the display device.

Further, in an embodiment, the array substrate further includes a third metal layer M3 forming a touch signal line S and a filling electrode 22. The filling electrode 22 is located in the through hole H1, and is in direct contact with the drain electrode 21 and covers the drain electrode 21, and a part of the filling electrode 22 is filled in the gap between each of the two ends of the drain electrode 21 and the side wall of the through hole H1. The pixel electrode 18 is in direct contact with the filling electrode 22, and is indirectly connected with the drain electrode 21 through the filling electrode 22. The filling electrode has a certain thickness, which can compensate the segment difference between the drain electrode and the side wall of the through hole, which solves the problem of wire breakage of the pixel electrode, and increases the yield of the display device. Moreover, in the present embodiment, the filling electrode and the touch signal line are formed in a same layer, as a result, an individual metal layer for forming the filling electrode is not necessary. During the manufacturing process, only one corrosion process is needed, it is not necessary to provide a mask for the touch signal line and the filling electrode, respectively. Therefore, the problem of wire breakage of the pixel electrode is solved without increasing the number of processing procedure and without increasing production cost.

In the present embodiment, the touch electrode is also used as the common electrode. The second insulating layer 17 is located between the common electrode and the pixel electrode, and configured to space and insulate the common electrode from the pixel electrode.

Figure 7:
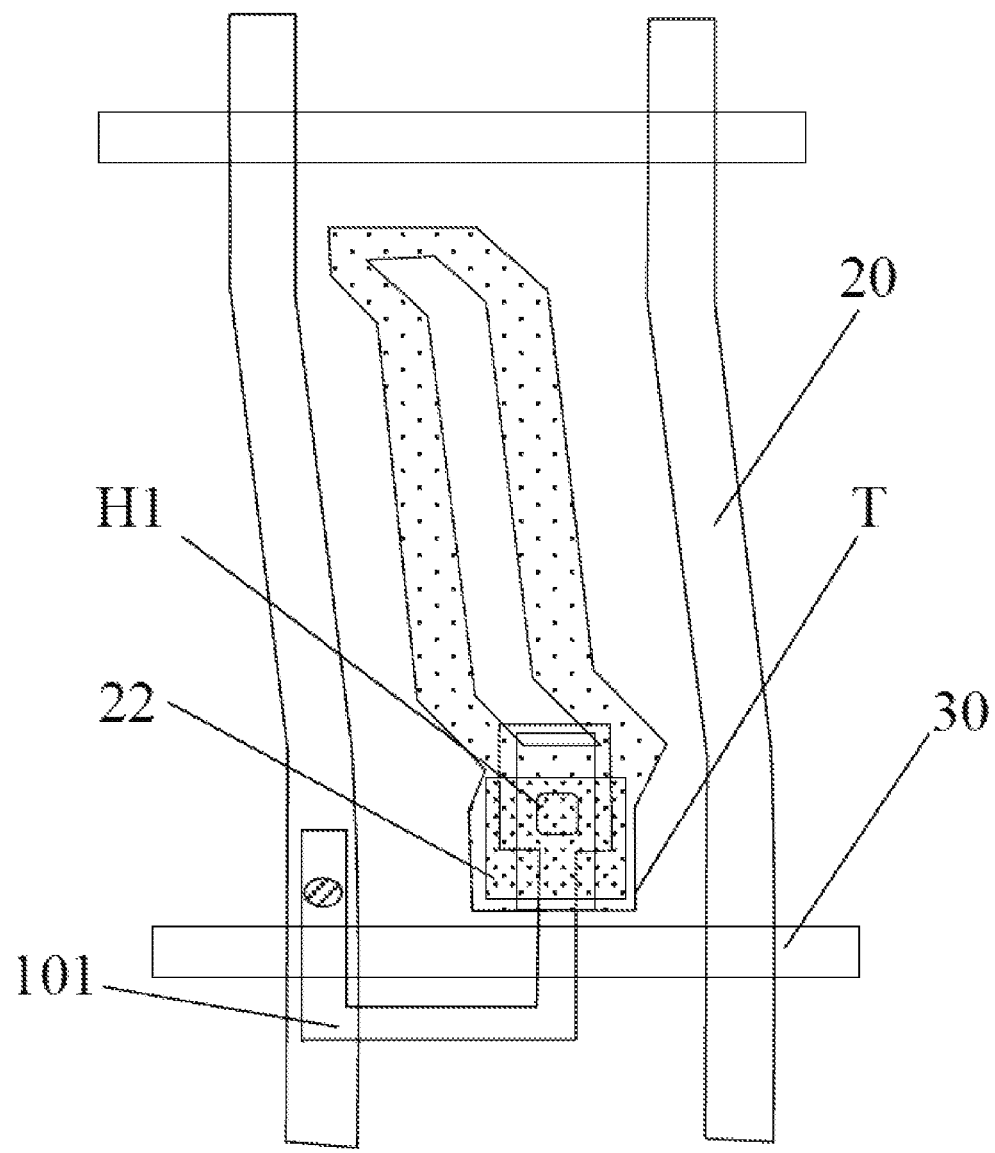
FIG. 7 illustrates a schematic diagram of another array substrate according to an embodiment of the present disclosure.
Figure 8:
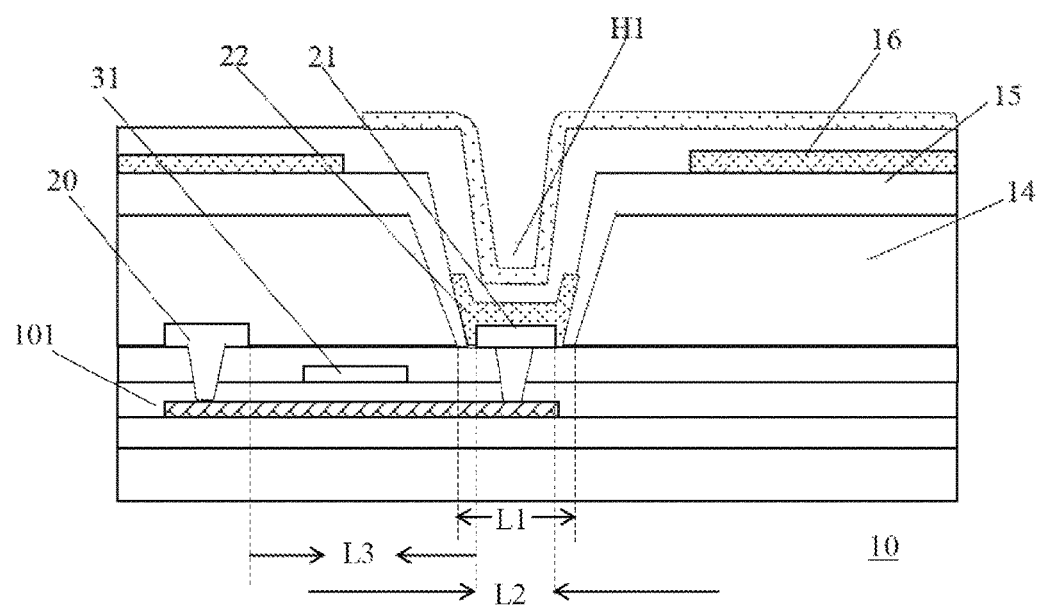
FIG. 8 illustrates a sectional view of the array substrate shown in FIG. 7.

FIG. 7 illustrates a schematic diagram of another array substrate according to an embodiment of the present disclosure, FIG. 8 illustrates a sectional view of the array substrate shown in FIG. 7. As shown in FIGS. 7-8, the array substrate 10 includes a plurality of data lines 20 and a plurality of scan lines 30. The plurality of data lines 20 and the plurality of scan lines 30 are arranged by intersecting, so as to define a plurality of pixel units 40. The plurality of pixel units 40 include a plurality of columns of pixel units arranged in a first direction and a plurality of rows of pixel units arranged in a second direction. Moreover, a thin film transistor T is arranged at the intersecting position of the data line 20 and the scan line 30. A plurality of thin film transistors T are arranged in a matrix.

The thin film transistor T includes an active layer 101, a gate electrode 31 and a drain electrode 21. A planarization layer 14 covers the gate electrode 31, the active layer 101 and the drain electrode 21 of the thin film transistor T. A position of the planarization layer 14 corresponding to the drain electrode 21 is provided with a through hole H1 penetrating through the planarization layer 14. The drain electrode 21 is totally located in the interior of the through hole H1, two ends of the drain electrode 21 are not in contact with a side wall of the through hole H1. A gap is provided between each of the two ends of the drain electrode 21 and the side wall of the through hole H1, that is, the width L2 between the two ends of the drain electrode 21 is smaller than the width L1 of the bottom of the through hole H1, which increases the distance L3 between the data line 20 and the drain electrode 21, since the pixel electrode 18 is connected with the drain electrode 21, and the drain electrode 21 and the data line 20 are formed in a same layer, which further increases the distance between the data line and the pixel electrode, and reduces the coupling capacitance between the data line and the pixel electrode, so that the influence of the data line to the pixel electrode is reduced, thereby improving the crosstalk phenomenon of the display device.

The array substrate further includes a common electrode 16 arranged on the planarization layer 14, and a first insulating layer 15 is arranged between the common electrode 16 and the planarization layer 14. In the present embodiment, the filling electrode 22 and the common electrode 16 are formed in a same layer. The filling electrode 22 is located in the through hole H1, and is in direct contact with the drain electrode 21 and covers the drain electrode 21, and a part of the filling electrode 22 is filled in the gap between each of the two ends of the drain electrode 21 and the side wall of the through hole H1. The pixel electrode 18 is in direct contact with the filling electrode 22, and is indirectly connected with the drain electrode 21 through the filling electrode 22. The filling electrode has a certain thickness, which can compensate the segment difference between the drain electrode and the side wall of the through hole, which solves the problem of wire breakage of the pixel electrode, and increases the yield of the display device. Moreover, the filling electrode and the common electrode are formed in the same layer by a transparent conductive material. During the manufacturing process, only one corrosion process is needed, it is not necessary to provide a mask for the filling electrode and the common electrode, respectively. Therefore, the problem of wire breakage of the pixel electrode is solved without increasing the number of processing procedure and without increasing production cost.

Further, in the present embodiment, an auxiliary filling piece is filled between each of the two ends of the drain electrode 21 and the side wall of the through hole H1, configured to compensate, together with the filling electrode, the segment difference between the drain electrode and the side wall of the through hole, which further solves the problem of wire breakage of the pixel electrode, and increases the yield of the display device. The auxiliary filling piece and the first insulating layer are formed in a same layer, it is not necessary to manufacture the auxiliary filling piece individually, which will not increase product processing procedure and production cost.

Figure 9:
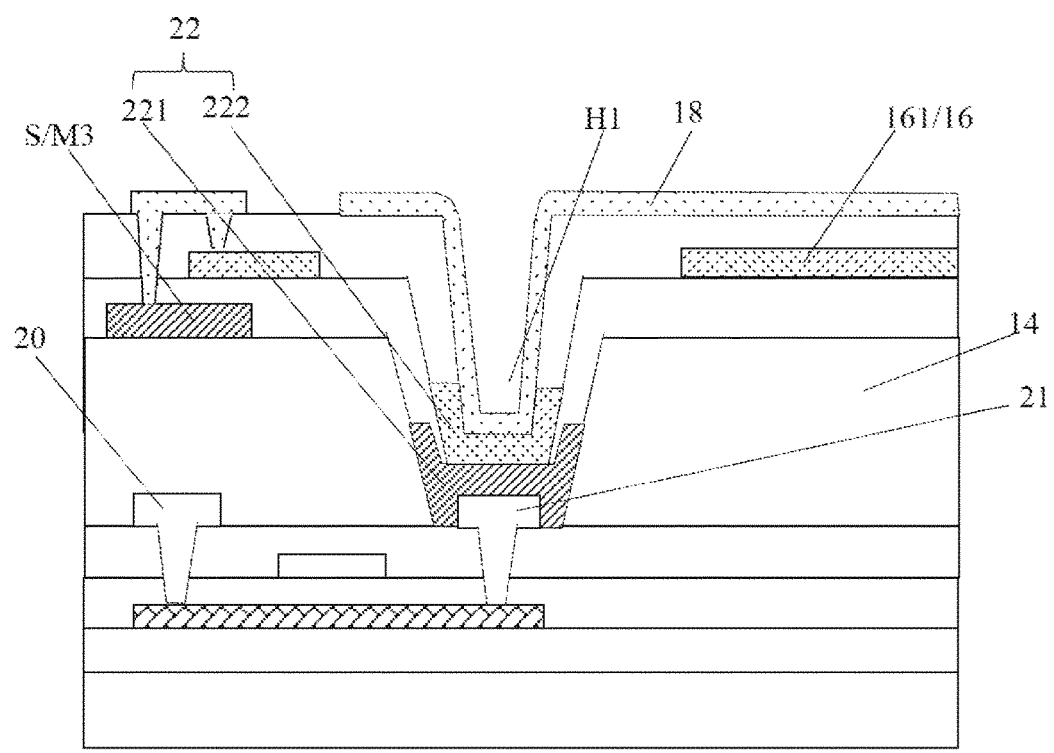
FIG. 9 illustrates a sectional view of still another array substrate according to an embodiment of the present disclosure.

FIG. 9 illustrates a sectional view of still another array substrate according to an embodiment of the present disclosure. As shown in FIG. 9, the array substrate provided by the present embodiment is similar to the array substrate provided by FIGS. 4-6, the array substrate includes a plurality of data lines and a plurality of scan lines. The plurality of data lines and the plurality of scan lines are arranged by intersecting, so as to define a plurality of pixel units. The plurality of pixel units include a plurality of columns of pixel units arranged in a first direction and a plurality of rows of pixel units arranged in a second direction. Moreover, a thin film transistor T is arranged at the intersecting position of the data line and the scan line. A plurality of thin film transistors T are arranged in a matrix.

The thin film transistor includes an active layer, a gate electrode and a drain electrode. A planarization layer covers the gate electrode, the active layer and the drain electrode of the thin film transistor. A position of the planarization layer 14 corresponding to the drain electrode 21 is provided with a through hole H1 penetrating through the planarization layer 14, the drain electrode 21 is totally located in the interior of the through hole H1, two ends of the drain electrode 21 are not in contact with a side wall of the through hole H1. A gap is provided between each of the two ends of the drain electrode 21 and the side wall of the through hole H1, that is, the width between the two ends of the drain electrode 21 is smaller than the width of the bottom of the through hole H1, which increases the distance between the data line 20 and the drain electrode 21, since the pixel electrode 18 is connected with the drain electrode 21, and the drain electrode and the data line 20 are formed in a same layer, which further increases the distance between the data line and the pixel electrode, and reduces the coupling capacitance between the data line and the pixel electrode, thereby improving the crosstalk phenomenon of the display device.

In the present embodiment, the array substrate further includes a common electrode 16 which can also be used as the touch electrode 161, and a touch signal line S formed by a third metal layer M3. The touch signal line S is connected with the corresponding touch electrode 161. The filling electrode 22 is located in the through hole H1 and configured to cover the drain electrode 21, and the filling electrode includes a first electrode 221 and a second electrode 222. The first electrode 221 is overlapped and is in direct contact with the second electrode 222. The pixel electrode 18 is in direct contact with the filling electrode 22, and is indirectly connected to the drain electrode 21 through the filling electrode 22. The first electrode 221 is overlapped with the second electrode 222, which can further increase the filling thickness of the filling electrode, better compensate the segment difference of the drain electrode, and solve the problem of wire breakage of the pixel electrode, thereby increasing yield of the display device. Further, the first electrode 221 and the touch signal line S are formed in a same layer, that is, the third metal layer M3. The second electrode 222 and the common electrode 16 are formed in a same layer by a transparent conductive material. Therefore, in the manufacturing process, it is not necessary to provide a mask for the first electrode 221 and the second electrode 222, respectively. Therefore, the problem of wire breakage of the pixel electrode is solved without increasing the number of processing and without increasing production cost.

In the array substrate provided by the embodiments of the present disclosure, through reducing the width of the drain electrode, which further increases the distance between the data line and the pixel electrode, and reduces the coupling capacitance between the data line and the pixel electrode, thus the influence of the data line to the pixel electrode is reduced, thereby improving the crosstalk phenomenon of the display device. Further, through providing a filling electrode in the through hole covering the drain electrode, which can compensate the segment difference due to the width of the drain electrode, and solve the problem of wire breakage of the pixel electrode, thereby increasing yield of the display device.

Figure 10:
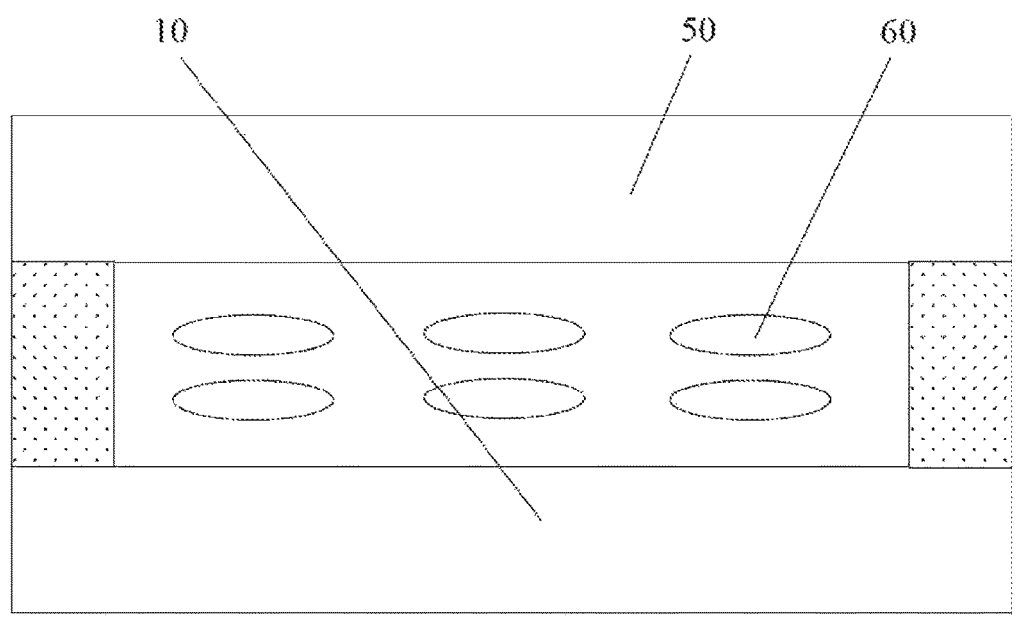
FIG. 10 illustrates a schematic diagram of a liquid crystal display panel according to an embodiment of the present disclosure.

Further, an embodiment of the present, disclosure provides a liquid crystal display panel, FIG. 10 illustrates a schematic diagram of a liquid crystal display panel according to an embodiment of the present disclosure. As shown in FIG. 10, the liquid crystal display panel includes an array substrate 10 and a color film substrate 50 which are arranged opposite to each other, and a liquid crystal layer 60 sealed between the array substrate 10 and the color film substrate 50. In an embodiment of the present disclosure, the liquid crystal layer 60 can be a negative liquid crystal. During working, the negative liquid crystal molecules in the liquid crystal layer 60 rotate or distort under action of an electric field between the pixel electrode and the common electrode on the array substrate, to allow or prevent light to pass through, the light further passes through an optical filtering layer, so as to display different colors, thereby displaying a final image.

Further, an embodiment of the present disclosure provides a display device, including the above liquid crystal display panel. The display device can be products or components having display function such as cellphone, tablet PC, television, display screen, laptop, digital photo frame, navigator etc.

It should be noted that, the above are only preferred embodiments of the present disclosure and principles thereof. Those skilled in the art shall understand, the present disclosure is not limited to the specific embodiments described herein. Without departing from the protection scope of the present disclosure, those skilled in the art can make any modification, adjustment and replacement. Therefore, although the present disclosure has been described in detail with reference to the above embodiments, the present disclosure is not limited to the above embodiments, but also includes other equivalent embodiments without departing from the inventive concept of the present disclosure. The scope of the present disclosure shall be determined by the appended claims.

What is claimed is:

1. An array substrate, comprising:
    a base substrate;
    a plurality of scan lines;
    a plurality of data lines intersecting with the plurality of scan lines;
    a plurality of thin film transistors arranged in a matrix, each thin film transistor comprising a gate electrode, an active layer and a drain electrode;
    a planarization layer covering the gate electrode, the active layer and the drain electrode,
    a filling electrode; and
    a pixel electrode;
    wherein a through hole is defined in a part of the planarization layer corresponding to the drain electrode, a width of the drain electrode is smaller than a width of a bottom of the through hole, and the drain electrode is located in an interior of the through hole;
    wherein the filling electrode is located in the through hole, and the filling electrode is connected with the drain electrode and covers the drain electrode; and
    wherein the pixel electrode extends through the through hole to connect with the filling electrode.

2. The array substrate according to claim 1, further comprising:
    a common electrode, located between the planarization layer and the pixel electrode; and
    a second insulating layer, located between the common electrode and the pixel electrode;
    wherein the filling electrode and the common electrode are formed in a same layer.

3. The array substrate according to claim 2, further comprising:
    a first insulating layer, provided between the planarization layer and the common electrode; and an auxiliary filling piece, filled between each of two ends of the drain electrode and a side wall of the through hole;

wherein the auxiliary filling piece and the first insulating layer are formed in a same layer.

4. The array substrate according to claim 1, further comprising:

a touch electrode; and a plurality of touch signal lines connected with a corresponding touch electrode;

wherein the filling electrode comprises a first electrode, and the first electrode and the touch signal lines are formed in a same layer.

5. The array substrate according to claim 4, wherein the touch electrode is located between the planarization layer and the pixel electrode, and a second insulating layer is provided between the common electrode and the pixel electrode.

6. The array substrate according to claim 5, wherein the filling electrode further comprises a second electrode, and the second electrode and the touch electrode are formed in a same layer.

7. The array substrate according to claim 4, wherein the touch signal lines is located between the planarization layer and the touch electrode, and a first insulating layer is provided between the touch signal lines and the touch electrode.

8. The array substrate according to claim 6, wherein during a display period, the touch electrode also serves as a common electrode.

9. A liquid crystal display panel, comprising an array substrate, a color film substrate arranged opposite to the array substrate, and a liquid crystal layer arranged between the array substrate and the color film substrate;

wherein the array substrate comprises:

a base substrate;

a plurality of scan lines;

a plurality of data lines intersecting with the plurality of scan lines;

a plurality of thin film transistors arranged in a matrix, each thin film transistor comprising a gate electrode, an active layer and a drain electrode;

a planarization layer covering the gate electrode, the active layer and the drain electrode, a filling electrode; and a pixel electrode;

wherein a through hole is defined in a part of the planarization layer corresponding to the drain electrode, a width of the drain electrode is smaller than a width of a bottom of the through hole, and the drain electrode is located in an interior of the through hole;

wherein the filling electrode is located in the through hole, and the filling electrode is connected with the drain electrode and covers the drain electrode; and wherein the pixel electrode extends through the through hole to connect with the filling electrode.

10. The liquid crystal display panel according to claim 9, wherein the liquid crystal layer comprises a negative liquid crystal.

11. A display device, comprising a liquid crystal display panel, wherein the liquid crystal display panel comprises an array substrate, a color film substrate arranged opposite to the array substrate, and a liquid crystal layer arranged between the array substrate and the color film substrate;

wherein the array substrate comprises:

a base substrate;

a plurality of scan lines;

a plurality of data lines intersecting with the plurality of scan lines;

a plurality of thin film transistors arranged in a matrix, each thin film transistor comprising a gate electrode, an active layer and a drain electrode;

a planarization layer covering the gate electrode, the active layer and the drain electrode, a filling electrode; and a pixel electrode;

wherein a through hole is defined in a part of the planarization layer corresponding to the drain electrode, a width of the drain electrode is smaller than a width of a bottom of the through hole, and the drain electrode is located in an interior of the through hole;

wherein the filling electrode is located in the through hole, and the filling electrode is connected with the drain electrode and covers the drain electrode; and wherein the pixel electrode extends through the through hole to connect with the filling electrode.

* * * * *